Sept. 14, 1954     A. W. HOLST     2,689,341

SAFETY DEVICE FOR INDICATING SHIFTING OF STRUCTURES

Filed Nov. 8, 1951     4 Sheets—Sheet 1

INVENTOR
ALBERT W. HOLST
BY:

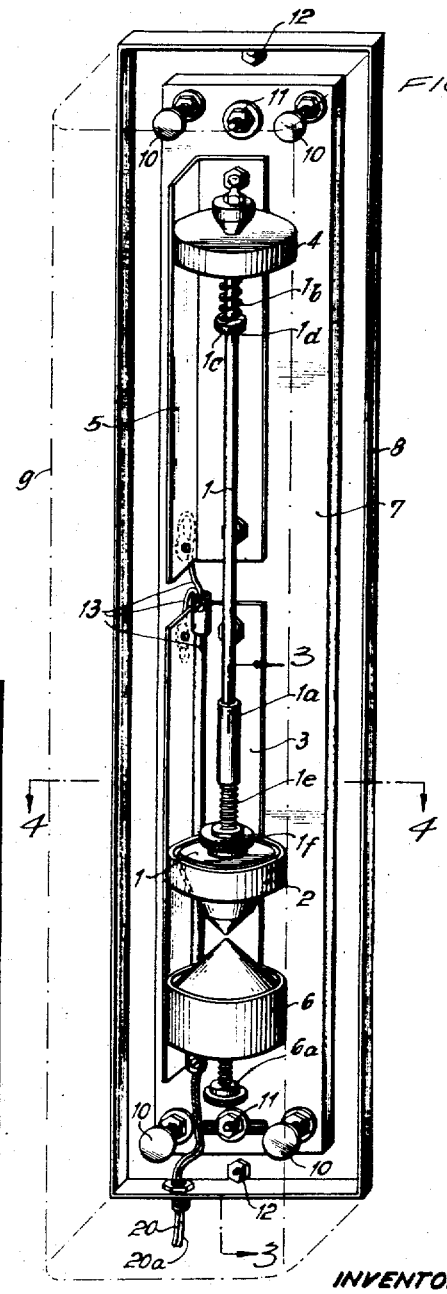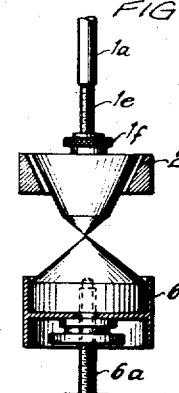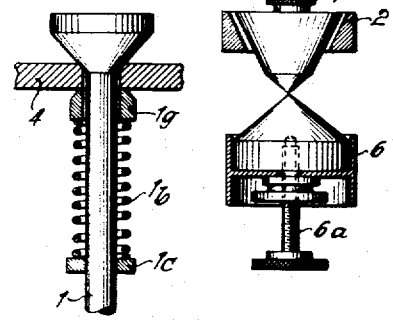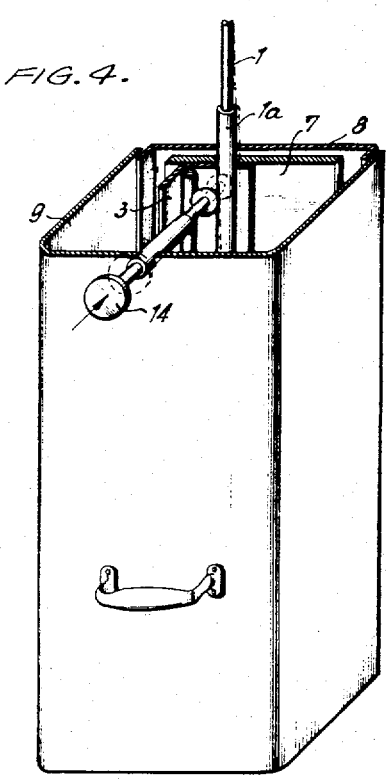

Sept. 14, 1954 A. W. HOLST 2,689,341
SAFETY DEVICE FOR INDICATING SHIFTING OF STRUCTURES
Filed Nov. 8, 1951 4 Sheets-Sheet 4
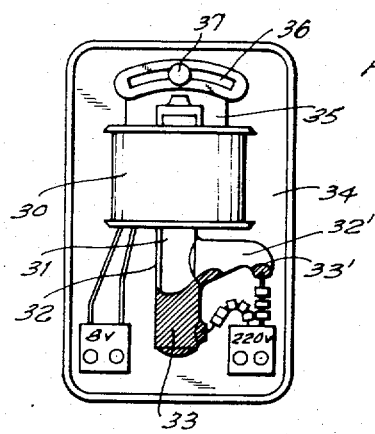
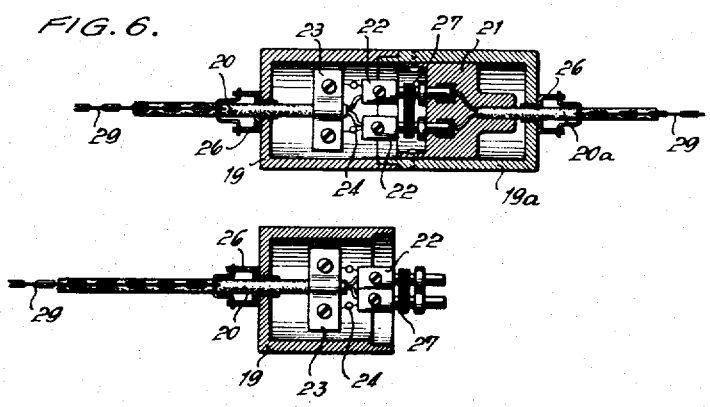
INVENTOR
Albert W. Holst Patented Sept. 14, 1954

2,689,341

UNITED STATES PATENT OFFICE 2,689,341

SAFETY DEVICE FOR INDICATING SHIFTING OF STRUCTURES

Albert W. Holst, Hamburg, Germany

Application November 8, 1951, Serial No. 255,393

7 Claims. (Cl. 340—213)

The present invention relates to a safety device adapted to give warning signals to travellers along highways and the like, so as to give an indication of dangerous shifting in the ground of the highway ahead of the traveller. For example, if the device of the present invention is mounted on a bridge it will energize a signal at the approaches to the bridge to indicate any shifting in the bridge structure.

It sometimes happens, due to changes in the direction of flow of subterranean waters or due to washing away or settlement of land, that bridge structures, for example, will shift so that it is dangerous to travel thereover. Often times such shifting is not obvious to the casual observer and a dangerous condition is allowed to exist for some time. Such shifting may also be brought about, for example, by explosions occurring in the vicinity of the bridge, such explosions being frequent in battle areas during war time.

Although only bridges have been specifically mentioned above, it is to be understood that the present invention is by no means limited to bridges but is fully applicable to other uses and may indicate the shifting of any surface. For example, the device of the present invention may be used to indicate the shifting of a road located at the edge of a cliff.

One of the objects of the present invention is to provide a safety device for indicating the shifting of a surface.

Another object of the present invention is to provide a safety device having an adjustable sensitivity.

A further object of the present invention is to provide a safety device with an indicator which is operable only after a predetermined time delay so that temporary jarring of the surface will not energize the indicator of the safety device.

An additional object of the present invention is to provide a safety device with a means for guaranteeing the energizing of an indicator thereof even after great shifting of a surface which would cause destruction of a part of the safety device located on the surface.

Still another object of the present invention is to equip a safety device of the above type with a simple means for checking the operating condition of the safety device.

A still further object of the present invention is to provide a safety device which may be reset after a shifting in the surface occurs.

Yet another object of the present invention is to provide a means for operating different parts of an electrical safety device at different voltages.

It is also among the objects of the present invention to provide a safety device which may be easily and quickly installed on different surfaces, which is constructed of relatively few, simple, easily obtainable parts, and which is exceedingly reliable in operation.

With the above objects in view the present invention mainly consists of a safety device for indicating the shifting of a surface, this safety device having an electrical switch means located on the surface, an indicating means located distant from the surface, and an electrical circuit means interconnecting the indicating means with the electrical switch means.

The electrical switch means comprises a pendulum bar having a bottom, electrically conductive, conical, pointed end and an electrically conductive ring member located about this conical end of the pendulum bar and having an inner conical surface of the same inclination as the end of the pendulum bar and spaced from the same to provide a cone-shaped space between the end of the pendulum bar and the ring member so that a circuit may be completed by movement of the end of the pendulum bar into contact with the ring member upon shifting of the surface. This ring member, together with a conical member of opposite inclination to the conical end of the pendulum bar and located opposite the same, is adjustably mounted for movement about the turning point of the pendulum bar so that the ring member may be properly located with respect to the lower end of the pendulum, the conical member indicating the proper location of the ring member. Of course, the conical member may be omitted, and the ring member may be positioned, with less accuracy, by eye so as to be spaced at all points from the lower end of the pendulum bar. The lower conical end of the pendulum bar is mounted for adjustable movement along the length of the latter so as to regulate the sensitivity of the device. The electrical circuit means interconnecting the electrical switch means and the indicating device includes a short circuit switch means which is adapted to be closed upon shifting of the surface to such an extent that the electrical switch means might be destroyed, so that in this way the energizing of the indicating device is assured even in the latter event. In order to prevent minor jars, which cause temporary shifting of the surface, from energizing the indicating means, the electrical circuit means also includes a time-limit relay which is adjustable so as to energize the indicating device only after a shifting of the surface exists for a predetermined length of time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is an elevational, isometric view of a switch means constructed in accordance with the present invention;

Fig. 3 is a fragmentary, sectional view taken along line 3—3 of Fig. 2 in the direction of the arrows;

Fig. 3a shows a detail of the structure of Fig. 2;

Fig. 4 is a fragmentary, isometric view, partially in section, taken along line 4—4 of Fig. 2 in the direction of the arrows;

Fig. 6 is a partially sectional view of a short-circuit switch means adapted to be included in the electrical circuit of the present invention;

Fig. 7 is a view of a part of the structure of Fig. 6, shown in a different position from that illustrated in Fig. 6; and Fig. 8 is a schematic illustration of a time-limit relay adapted to be included in the electrical circuit of the present invention.

Figure 1:
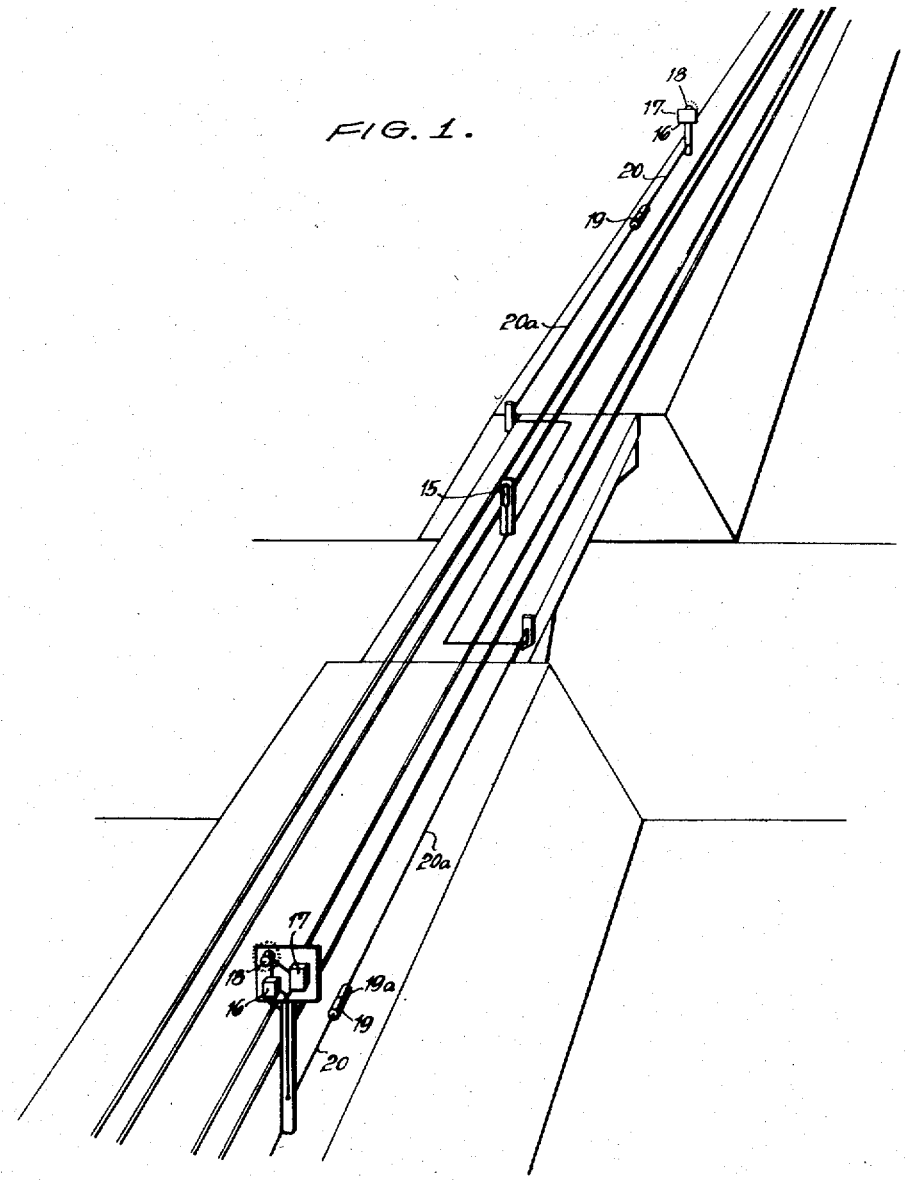
Fig. 1 is a schematic illustration of the safety device of the present invention mounted on a bridge and its approaches.

Referring now to the drawings, there is schematically shown in Fig. 1 the approaches located on opposite sides of the bridge to which the safety device of the present invention is connected to indicate shifting of the surface thereof. As is shown in Fig. 1, the electrical switch means 15 is mounted on a post which is located directly on the bridge. The leads 20a extend from the switch means 15 to the opposite approaches of the bridge and are connected to the short-circuit switch means which are in turn connected by the leads 20, respectively, to the indicating means 18. Each of the electrical circuits on each side of the switch 15 includes the transformer 16 and the relay 17. As is apparent from Fig. 1, the parts 16, 17 and 18 are mounted on a post located distant from the bridge, and the electrical leads extend from this latter post to another post located at an end of the bridge, the leads extending from this other post to the switch means 15. The particular indicator means illustrated in Fig. 1 is an electric light bulb, although it is to be understood that any other indicator means, such as a buzzer, for example, may be used in the apparatus of the present invention.

Figure 5:
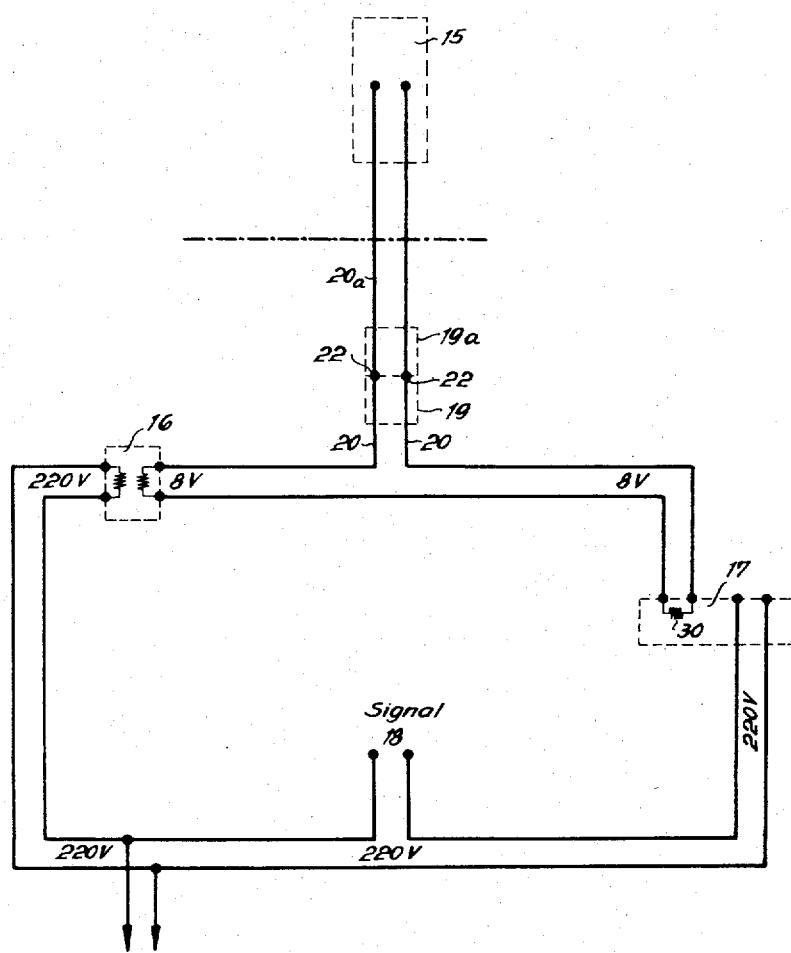
Fig. 5 is a wiring diagram of an electrical circuit adapted to be used with the present invention.

The wiring diagram of the present invention is shown in Fig. 5 where the lamp 18 is shown to be connected in parallel with the mains, which may be the general source of electric supply used by the public, and also the primary winding of the transformer 16 is connected in parallel with the lamp 18. The relay 17, except for the energizing coil thereof, is connected in series with the lamp 18. The switch means 15 is connected in series with the secondary winding of the transformer 16 and the energizing coil of the relay 17. This transformer thus permits the lamp 18 to operate at a relatively high voltage, so that a bright illumination is assured, while a low voltage is supplied to the switch means 15 and the energizing coil of relay 17. The purpose of this low voltage is to prevent arcing across contacts of the switch means 15 or the poles 22 of the short-circuit switch means. With the electrical circuit shown in Fig. 5, the primary coil of transformer 16 is continually energized, and the moment the circuit is completed through the switch means 15 a current is induced in the secondary coil of the transformer 16 and the energizing coil of the relay 17 to complete the circuit to the signal lamp 18. The primary windings of the transformer 16 and the lamp 18 may be adapted to operate at 220V, for example, and the switch means 15 and energizing coil of the relay 17 may be adapted to operate at 8 V, for example.

The details of one possible construction of the switch means 15 are illustrated in Fig. 2, where the switch means 15 is shown to include a pendulum bar 1 having a downwardly extending cone mounted on the upper end thereof and located in the bore of the fixedly mounted dish 4 so that the pendulum may freely swing in any direction. Mounted about the upper end portion of the bar 1 is the coil spring 1b which bears with its upper end against the dish 4 and which may have the compression thereof adjusted by the collar 1C located at the lower end of the spring 1b and adjustably mounted on the bar 1 by the set screw 1d passing through the collar 1C. If desired, the end of spring 1b may bear against or terminate in a member 1g which curves upwardly toward and bears against the dish 4, so as to prevent access of spring 1b to the bore of dish 4, as shown in Fig. 3a.

As is apparent from Figs. 2 and 3, the pendulum bar 1 has its lower end in the form of a cone which extends downwardly and which is threadedly mounted on the lower threaded portion 1e of the bar 1. The upper surface of the cone has the knurled internally threaded member 1f fixedly connected thereto so that, upon turning of member 1f, the lower conical end of bar 1 may be moved up or down along the length of the latter. This lower conical end of the bar 1 is electrically conductive and is located within an electrically conductive ring member 2 having an inner annular conical surface of the same inclination as the conical end of bar 1, as shown in Figs. 2 and 3. As is apparent from Figs. 2 and 3, the threaded portion 1e of bar 1 is connected to the main portion thereof by the nipple 1a, and upon upward or downward movement of the lower conical end of bar 1, the annular space between the latter and ring member 2 may be increased or decreased so as to regulate the sensitivity of the switch means.

The dish member 4 is fixedly mounted on the angle bar 5 and the ring member 2 is fixedly mounted on the angle bar 3, one of the leads 13 of the circuit portion 20a being electrically connected to the bar 3 and the other of the leads 13 of the circuit portion 20a being electrically connected to the bar 5. These angle bars 3 and 5 are mounted on a plate 7 of an electrical insulating material which is connected by the screw means 11 to a support plate 8. The lower screw means 11 is located in a slot of the plate 7 so that the latter may be turned about the upper screw means 11 to properly locate the ring member 2 with respect to the lower end of bar 1. The angular position of the plane of plate 7 with respect to the plane of plate 8 may be adjusted by the four screws 10 which pass respectively through the four corners of the plate 7 and abut against the plate 8 so that the ring member 2 is universally adjustable about the lower end of bar 1.

Below the ring member 2 there is fixedly mounted on the bar 3 a bracket for supporting a conical member 6 having an inclination opposite to that of the lower end of bar 1 and being located opposite the latter. As is apparent from Fig. 3, this bracket includes a perforated shelf having an internally threaded nut member fixed to the bottom side thereof so that the screw 6a which engages this nut member and supports the conical member 6 may be turned to raise and lower the conical member 6 so that it may always be located immediately below the lower conical end of pendulum bar 1, irrespective of the adjustment of the lower conical end of bar 1 on the latter. It is evident that this conical member 6 is mounted for adjustable movement with the ring member 2 so that when the point of member 6 is located directly opposite the point of the lower end of the pendulum bar 1, the device is properly adjusted with a uniform, annular, cone-shaped space between the ring member 2 and the lower conical end of bar 1. The screw members 12 shown in Fig. 2 are used to mount the switch means on a post, as shown in Fig. 1.

As is indicated in dot dash lines in Fig. 2, the switch means includes a cover 9 which, as is shown in Fig. 4, is provided with a bore to fixedly support a tube extending transversely to the bar 1. A first cylindrical piece having a knob 14 at the outer end thereof is slidably mounted in the outer end portion of this tube, and a second cylindrical piece is slidably mounted in the inner end portion of this tube and carries a pair of collar members respectively located on opposite sides of the nipple 1a. Within this tube there is located a coil spring having the opposite ends thereof fixed to the cylindrical pieces, respectively, so that the movement of bar 1, due to shifting of the bridge, for example, is in no way resisted by the cylindrical pieces. However, when it is desired to check the operating condition of the device it is only necessary to push the knob 14 inwardly toward the bar 1, as shown by the arrow in Fig. 4, so as to bring about a contact between the ring member 2 and the lower conical end of bar 1 to determine whether or not the lamp 18 becomes illuminated. If the latter does not become illuminated, something is wrong with the apparatus and it should be repaired. Upon release of the knob 14, the bar 1 will by gravity automatically relocate itself with the lower conical end thereof spaced from the ring member 2.

It is evident that upon occurrence of major shifting of the approaches to the bridge and of the bridge itself, the latter may completely collapse and destroy the switch means 15. In order to assure, under such conditions, the energizing of the indicator means, such as lamp 18, located distant from the bridge, there is provided a short circuit switch means, comprising the housing members 19 and 19a, located on the approach to the bridge and adjacent to the signal lamp 18, as shown in Fig. 1.

The details of the short-circuit switch means are illustrated in Figs. 6 and 7. In Fig. 6 there are shown the housing members 19 and 19a which are in frictional engagement with each other, as illustrated, the housing 19a having its left end portion, as viewed in Fig. 6, fitting into the right hand end portion of housing portion 19, as viewed in Figs. 6 and 7. Fixedly mounted within the housing portion 19a, by means of rivets or the like, is the plug 21 having a pair of sockets formed therein and in electrical communication with the leads 20a leading to switch means 15. The leads 20, coming from the parts 16—18, terminate, within the housing formed by parts 19 and 19a, in the pole members 22 which are resiliently urged toward each other by the resilient, electrically non-conductive member 27, the pole members 22 being held apart from each other against the action of resilient member 27 by the sockets of plug 21.

Each of the housing parts 19 and 19a supports in its end wall a bracket member 26 which may be mounted in a threaded opening of this end wall by an outwardly threaded socket through which the lead 20 or 20a extends. As is shown in Figs. 6 and 7, these brackets 26 have connected thereto the chain members 29 which extend from the housing 19, 19a to the posts to which the leads are connected, as shown in Fig. 1. Upon a major bridge movement, of a magnitude which is sufficient to destroy switch means 15, for example, the housing portion 19, 19a will be drawn apart from each other and the plug 21 will thereby be separated from the poles 22 so that the latter will be released to the action of resilient member 27 and thereby drawn into contact with each other to complete a circuit through the signal lamp 18, even though switch means 15 should be destroyed, the pole members 22 having the pulling force thereon transferred to the supporting bracket 23 of the housing portion 19 by the electrically-non-conductive members 24. The chain members 29 guarantee the separation of the housing portions 19, 19a from each other upon a major shifting of the bridge, because these chain members are relatively strong and will not break before the housing portions 19, 19a are pulled apart from each other, whereas there is a possibility that one of the leads 20 or 20a might break upon a major shifting of the bridge, and this would obviously prevent the signal lamp 18 from becoming illuminated. Thus the chain members 29 protect the leads 20, 20a and guarantee the proper functioning of the short-circuit switch means shown in Figs. 6 and 7. In Fig. 7, the poles 22 are shown in the short-circuit position after housing portion 19a has been separated from housing portion 19. It is believed evident that upon collapse or great movement of the bridge, the chain 29 connected to housing portion 19a will be pulled and thereby cause separation of the housing parts 19 and 19a.

From the above description of switch means 15, illustrated in Figs. 2 and 3, it is evident that the sensitivity of the safety device depends only upon the adjustment of the lower conical end of pendulum bar 1 with respect to ring member 2. Thus if this lower conical end pendulum bar 1 is set in a position very close to ring member 2, the safety device will give indications of very small shifting of the surface of the bridge, and thus a very sensitive safety device is provided. However, when the safety device is set to register very small changes in the bridge surface, it is quite possible that the switch means 15 will be closed simply by temporary jarring of the bridge caused by heavy vehicles passing thereover, for example.

In order to prevent these temporary shiftings of the bridge surface from energizing the signal lamp 18, the relay 17 is of the time-delay type and may have the construction shown in Fig. 8.

Thus, in Fig. 8 there is shown the heating coil 30 mounted on the frame 35, which in turn is pivotally mounted on the base plate 34 and comprises the slot 36 through which the screw member 37 extends into engagement with the base plate 34 so that the frame 35 may be fixed in a desired angular position on the plate 34. The heating coil 30 is located about the heat conductive element 31 which is adapted to be heated by coil 30 and extends downwardly into the lower portion 33 of tube 32, in which mercury is located. The tube 32 has a side extension 32' which has a lower inclined surface, as shown in Fig. 8, and terminates in the downwardly bent portion 33', in which a small amount of mercury is located, as shown in Fig. 8. The two poles of relay 17, which are connected to each other when relay 17 is energized, are respectively located in the lowermost portion 33 of tube 32 within the mercury and within the bent end portion 33' of side extension 32', also within the mercury. Upon the energizing of coil 30 by completing of the circuit through switch means 15, member 31 will heat the mercury so that it rises up along the side extension 32' of tube 32 until it makes contact with the mercury in the bent portion 33' of the same so as to complete the circuit. This will take a predetermined length of time which, with the position illustrated in Fig. 8, where the members 31 and 32 are vertical, may take about 15 seconds, this length of time depending on the size of the relay and in particular on the relationship between the magnitude of the parts thereof, i. e. between the quantity of mercury in tube 32 on the one hand and on the length of said tube and space between the same and element 31 on the other hand. It is believed apparent that, as the frame 35 is adjusted on base plate 34 so that the members 31 and 32 move to the right from the vertical position shown in Fig. 8, the time for completing the circuit through the relay will be decreased, whereas, as members 31 and 32 move to the left from the vertical position shown in Fig. 8, the length of time for completing the circuit through the relay 17 will be increased. The decrease or increase in time necessary for completing the circuit through the relay may respectively amount to about 4 seconds. Thus the relay 17 enables the signal lamp 18 to be illuminated only as a result of permanent shifts in the surface of the bridge, while the switch means 15 permits the signal lamp 18 to become illuminated even upon the occurrence of very small shifts in the bridge surface. The time delay of the relay does not in any way effect the sensitivity of switch means 15 and only prevents the lamp 18 from being illuminated by the temporary shifting of the surface of the bridge.

With the above apparatus, any minor change in the surface of the bridge will be indicated by the illumination of the lamp 18, so that the authorities may inspect the bridge and its approaches to determine whether or not the bridge and these approaches are safe to travel on. If the authorities should decide that the bridge and its approaches are still safe, then it is only necessary to reset the switch means 15, as described above, so that it will then give an indication of further shifting of the bridge.

As was mentioned above, although the safety device has been described in connection with a bridge, it is to be understood that the device is equally suitable for use on any road surfaces, for example, which are likely to shift so as to give an indication of a shift in the road surface.

It will be understood that each of the elements described above, or two or more together, may also find a useful application in other types of safety devices differing from the types described above.

While the invention has been illustrated and described as embodied in safety devices for indicating the shifting of a surface, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A safety device for indicating shifting of a surface, comprising in combination, an electrical switch means comprising a pendulum bar provided with a bottom electrically conductive end and a stationary electrical contact located adjacent to said bottom end of said pendulum bar, said switch means being mounted on the surface; electrical indicating means located distant from the surface; and electrical circuit means interconnecting said indicating means and switch means for completing a circuit to said indicating means upon contact of said bottom end of said pendulum bar with said stationary electrical contact, whereby, when the surface shifts, an indication of the shifting will be given by said indicating means, said electrical circuit means including a short-circuit switch means located adjacent to said indicating device to be closed upon great shifting of the surface so as to guarantee energizing of said indicating device even though said electrical switch means is destroyed.

2. A safety device for indicating shifting of a surface, comprising in combination, an electrical switch means comprising a pendulum bar provided with a bottom electrically conductive end and a stationary electrical contact located adjacent to said bottom end of said pendulum bar, said switch means being mounted on the surface; electrical indicating means located distant from the surface; and electrical circuit means interconnecting said indicating means and switch means for completing a circuit to said indicating means upon contact of said bottom end of said pendulum bar with said stationary electrical contact, whereby, when the surface shifts, an indication of the shifting will be given by said indicating means, said electrical circuit means including a short-circuit switch means located adjacent to said indicating device for being closed uopn great shifting of the surface so as to guarantee energizing of said indicating device even though said electrical switch means is destroyed, said short-circuit switch means comprising a plug member connected to said electrical switch means and having a pair of sockets, a pair of electrical pole members respectively mounted in said sockets, and electrically non-conductive resilient means connected to said pole members for urging the same towards each other, said plug member holding said pole members away from each other against the action of said resilient means so that when a great enough shifting occurs to cause said electrical switch means to move said sockets of said plug member out of contact with said pole members the latter will contact each other under the action of said resilient means and complete a circuit to said indicating means.

3. A safety device for indicating shifting of a surface or the like, comprising, in combination, electrical switch means adapted to be mounted on a surface or the like, shose shifting is to be indicated; electrical indicating means adapted to be located distant from said switch means and the surface on which said switch means is adapted to be mounted; and an electrical circuit interconnecting said indicating means and switch means to energize said indicating means upon closing of said switch means, said electrical circuit having a weakest mechanical connection formed by two parts located between said switch means and indicating means and being releasably held together so as to become separated from each other before other portions of said circuit give way, and automatic short circuiting means operatively connected to that one of said parts which is electrically connected to said indicating means to energize the latter upon separation of said parts of said circuit, the latter being connected to a source of current at a point located between said indicating means and said one part of said circuit.

4. An arrangement for indicating shifting of a first member relative to a second member comprising, in combination, electrical indicating means located on said second member; an electrical circuit including said electrical indicating means and being connected at said second member to a source of current for energizing said electrical indicating means; a short circuit switch included in said circuit and adapted to close the circuit upon exertion of a predetermined pull thereon; electrical switch means adapted to be mounted on said first member and adapted to be closed upon shifting thereof; conductor means connecting said electrical switch means with said short circuit switch so as to close through the same, in the event of minor shifting movements, said electrical circuit and operate said indicating means, while a major shifting movement of said first member resulting in exertion of said pull upon said short circuit switch by said conductor means will close said short circuit switch and permanently operate said indicating means.

5. A safety device as defined in claim 3 and wherein said short circuiting means comprises a socket means forming the other of said two parts of said circuit and having a pair of spaced sockets therein; plug means forming said one part of said circuit and having a pair of plug members adapted to be located in said spaced sockets, said plug members being mounted in said plug means for free movement toward and away from each other and being held apart from each other by said sockets when said plug members are located therein; and resilient means operatively connected to said plug members for urging the same toward and into engagement with each other so that when said socket means and said plug means are separated from each other said resilient means automatically moves said plug members into contact with each other.

6. An arrangement as defined in claim 4 and wherein said short circuit switch comprises a socket means having a pair of spaced sockets therein; plug means having a pair of plug members adapted to be located in said spaced sockets, said plug members being mounted in said plug means for free movement toward and away from each other and being held apart from each other by said sockets when said plug members are located therein; and resilient means operatively connected to said plug members for urging the same toward and into engagement with each other so that when said socket means and said plug means are separated from each other said resilient means automatically moves said plug members into contact with each other.

7. An arrangement as defined in claim 4 and wherein said electrical circuit includes a time-limit relay to prevent temporary minor shifting of the surface from energizing said indicating means.

References Cited in the file of this patent

UNITED STATES PATENTS

| Number | Name | Date |
|---|---|---|
| 594,323 | Carpenter | Nov. 23, 1897 |
| 893,997 | Hass et al. | July 21, 1908 |
| 1,754,360 | Hendricks | Apr. 15, 1930 |
| 2,188,725 | Riggs | Jan. 30, 1940 |
| 2,226,441 | Paul | Dec. 24, 1940 |
| 2,279,655 | Catania | Apr. 14, 1942 |
| 2,449,177 | Perry | Sept. 14, 1948 |
| 2,468,945 | Sasser | May 3, 1949 |
| 2,511,631 | Gordon | June 13, 1950 |
| 2,592,989 | Wilson | Apr. 15, 1952 |

FOREIGN PATENTS

| Number | Country | Date |
|---|---|---|
| 532,772 | Great Britain | Jan. 30, 1941 |
| 11,026 | Austria | Mar. 10, 1903 |